(12) United States Patent
Amaral

(10) Patent No.: US 10,996,017 B2
(45) Date of Patent: May 4, 2021

(54) QUICKLY DEPLOYABLE TRIPOD

(71) Applicant: Andrew Amaral, Santa Margarita, CA (US)

(72) Inventor: Andrew Amaral, Santa Margarita, CA (US)

(*) Notice: Subject to any disclaimer, the term of this patent is extended or adjusted under 35 U.S.C. 154(b) by 0 days.

(21) Appl. No.: 16/576,167

(22) Filed: Sep. 19, 2019

(65) Prior Publication Data

US 2021/0088303 A1 Mar. 25, 2021

(51) Int. Cl.
| | | |
|---|---|---|
| *F41A 23/14* | (2006.01) | |
| *F16M 11/14* | (2006.01) | |
| *F16M 11/36* | (2006.01) | |
| *F41C 27/00* | (2006.01) | |

(52) U.S. Cl.
CPC .............. *F41A 23/14* (2013.01); *F16M 11/14* (2013.01); *F16M 11/36* (2013.01); *F16M 2200/025* (2013.01); *F41C 27/00* (2013.01)

(58) Field of Classification Search
CPC ......... F41A 23/14; F16M 11/14; F16M 11/36; F16M 2200/025; F41C 27/00
USPC .. 248/122.1, 663, 430, 181.1, 181.2, 288.31
See application file for complete search history.

(56) References Cited

U.S. PATENT DOCUMENTS

| | | | | |
|---|---|---|---|---|
| 1,797,893 | A * | 3/1931 | Zerk | F16M 11/14 248/181.1 |
| 2,168,988 | A * | 8/1939 | Hultquist | F16M 11/14 248/181.1 |
| 4,317,552 | A * | 3/1982 | Weidler | F16M 11/16 211/203 |
| 5,288,044 | A * | 2/1994 | Chen | F16M 11/2014 248/183.1 |
| 7,111,424 | B1 | 9/2006 | Moody | |
| 8,444,538 | B2 | 5/2013 | Knopf et al. | |
| 8,549,786 | B1 * | 10/2013 | Griffith | F41A 23/14 42/94 |
| 9,417,508 | B2 * | 8/2016 | Yang | F16M 11/2078 |
| 9,568,143 | B2 | 2/2017 | Ben Meir | |
| D807,421 | S * | 1/2018 | Yin | D16/244 |
| 10,612,719 | B2 * | 4/2020 | Li | F16M 11/16 |
| 2009/0056192 | A1 | 5/2009 | Oz | |
| 2010/0019109 | A1 * | 1/2010 | Liu | F16M 11/046 248/168 |
| 2016/0116103 | A1 * | 4/2016 | Gabrielli | F16M 11/24 248/125.8 |
| 2017/0146891 | A1 * | 5/2017 | Chen | F16M 11/045 |
| 2019/0032841 | A1 * | 1/2019 | Becker | F16M 11/36 |
| 2020/0292124 | A1 * | 9/2020 | Li | F16M 11/16 |

* cited by examiner

*Primary Examiner* — Muhammad Ijaz
(74) *Attorney, Agent, or Firm* — LEEPI

(57) ABSTRACT

A quickly deployable tripod is comprised of a helmet unit formed at the top thereof, a ball unit connected inside the helmet unit, a yoke unit connected at the bottom of the ball unit, and a plurality of the leg units connected to the yoke unit. The helmet unit is configured to fix an object thereon. The ball unit is configured to adjust orientation of the helmet unit. The yoke unit is configured to adjust position of the plurality of leg units. And the plurality of the leg units is configured to adjust orientation thereof respectively.

14 Claims, 11 Drawing Sheets

SECTION B-B

Deployed & Locked position

SECTION C-C

Unlocked position

SECTION D-D

Folded & Locked position

Deployed & Locked position

Unlocked position

Folded & Locked position

Locking collar engaged

Locking collar disengaged

QUICKLY DEPLOYABLE TRIPOD

FIELD OF THE INVENTION

The present invention relates to a quickly deployable tripod. More specifically, the proposed quickly deployable tripod attached to a firearm rapidly folds and deploys, occupying small space when collapsed. The present invention is applicable to not only the firearm, but also to any device for fixing its position and orientation.

BACKGROUND OF THE INVENTION

The accuracy of the shot is one of the most important factors in the use of personal rifles and firearms in combat. However, it is practically difficult to install a mechanism to support the firearm in this kind of urgent situation. Usually, the weight of the firearm is supported by the soldier's body, which reduces the shot accuracy, especially for a long-range target.

In practice, shooting sticks, mono-, bi-, and tri-pods etc., have been devised so as to secure the firearms.

U.S. Pat. No. 7,111,424 B1 disclosed a fore grip with a concealable and collapsible bipod has a tubular recess consisting of two cylindrical cutouts the housing for the legs when concealed and as the housing for a sliding piston that deploys the legs. The bipod legs deploy from the handgrip and lock in the extended position when a latch releases a spring. However, the locked bipod then restricts the above-mentioned motions.

To overcome the lock issue, US Patent Application Publication No. 2009/0056192 discloses a firearm handgrip with a collapsible bipod that is retractable within a vertical handgrip. Specifically, the bipod is quickly deployed by pressing a button that activates a release mechanism. But, two prior arts possess intrinsic limitation that the bipod is located inside the fore grip and the length of the bipod is limited by the length of the fore grip.

U.S. Pat. No. 8,444,538 disclosed a monopod that is retracted and concealed inside the rear grip handle when not used, and supports and stabilizes the firearm when the monopod is extended. A spring biased button can be depressed to allow for springs on top of retracted telescoping cylinders to spread apart and extend out from beneath a grip handle on the rifle.

It is configured to have multiple extensions by a telescopic configuration in adjustment of the length, but the all the parts are housed inside the rear grip handle and only possible to be made as a monopod due to the space limitation, which supports much less stability compared to the bipod.

U.S. Pat. No. 9,568,143 represents a tripod with fast opening and closing mechanism and methods of use which is generally applicable for supporting any kinds of device. The invention is directed to a tripod having a fast opening and positioning mechanism configured to allow a user to open said tripod in a photographing location while maintaining eye contact with an object to be photographed, comprising legs having telescopic segments and a central locking mechanism operated by a handle having a trigger connected to a loaded spring positioned on a central column. But, this prior art is not adequate to attach onto the firearms by its size that occupies large volume when folded.

According to the cited prior arts, none of the prior art have not disclosed a fast, efficiently deployable tripod, which is especially crucial, in application to the firearms.

So, the first objective of the present invention is to suggest a quickly deployable tripod such that the orientation of an attached entity therein is adjusted quickly by rotating a lever.

The second objective of the present invention is to suggest a quickly deployable tripod such that the alignment of a plurality of the legs therein is adjusted quickly by a drop lever.

Finally, the third objective of the present invention is to suggest a quickly deployable tripod such that the orientation of the plurality of the legs is adjusted quickly by rotating a locking collar.

SUMMARY OF THE INVENTION

In accordance with an illustrative embodiment, there is provided a quickly deployable tripod that includes a helmet unit formed at the top thereof, a ball unit connected inside the helmet unit, a yoke unit connected at the bottom of the ball unit, and a plurality of the leg units connected to the yoke unit.

In accordance with an illustrative embodiment, the helmet unit further includes a neck formed at the top of the helmet unit, a brow connected to the bottom of the neck, a nose connected to both the neck and the brow, and a lever connected to the brow by a dual-axis pin.

In accordance with an illustrative embodiment, the ball unit further includes a ball formed at the top of the ball unit, a plurality of the studs connected to both sides of the ball, and a suspension bar connected to the plurality of the studs.

In accordance with an illustrative embodiment, the yoke unit further includes a spine formed at the center of the yoke unit with a serrated feature formed at one end thereof, a left arm connected to the spine by a left arm connecting pin with a serrated feature formed at one end thereof, a right arm connected to the spine by a right arm connecting pin with a serrated feature formed at one end thereof, a drop lever located inside the spine, and a tapered pin located inside the spine and aligned at both ends of the left arm and the right arm.

In accordance with an illustrative embodiment, the plurality of the leg units further includes a leg adapter formed at the top of the plurality of the leg units, a fork located inside the leg adapter, a locking collar connected at the bottom of the fork by a collar connecting pin, a plurality of the extruded rods formed at the locking collar in radial direction thereof, a plurality of the leg tubes connected at the bottom of the leg adapter, a shoe connected at the bottom of the plurality of the leg tubes, and a fishhook connected on the side of the shoe.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE BEST MODE

Figure 1A:
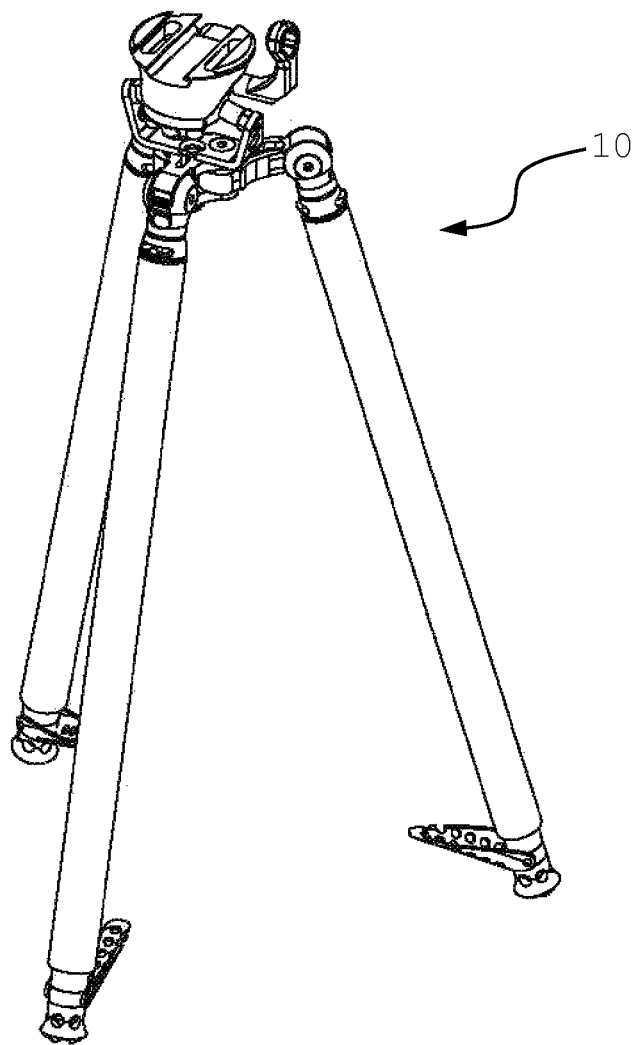
FIG. 1A is a perspective view of a quickly deployable tripod and FIG. 1B is an expanded view in accordance with an illustrative embodiment.

Hereinafter, illustrative embodiments and examples will be described in detail so that inventive concept may be readily implemented by those skilled in the art. However, it is to be noted that the present disclosure is not limited to the illustrative embodiments and examples but can be visualized in various other ways. In drawings, parts not directly relevant to the description are omitted to enhance the clarity of the drawings, and like reference numerals denote like parts throughout the whole document.

Throughout the whole document, the term "on" that is used to designate a position of one element with respect to another element includes both a case that the one element is adjacent to the other element and a case that any other element exists between these two elements.

The terms "comprises or includes" and/or "comprising or including" used in the document means that one or more other components, steps, operations and/or existence or addition of elements are not excluded in addition to the described components, steps, operations and/or elements unless context dictates otherwise. The terms "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Throughout the whole document, the term "step of" does not mean "step for".

Throughout the whole document, the term "combination of" included in the Markush type description means a mixture or combination of one or more components, steps, operations and/or elements selected from the group consisting of components, steps, operations and/or elements described in the Markush type and thereby means that the disclosure includes one or more components, steps, operations and/or elements selected from the Markush group.

Furthermore, in the following description of illustrative embodiments, terms related to a direction or a position (upper side, lower side, up and down directions, etc.) are defined with respect to the arrangement state of individual components shown in drawings. For example, the "upper side" and the "lower side" may be defined as the upper side and the lower side when viewed from FIG. 1, that is, the "left side" and the "right side" on a paper plane. However, it should be noted that when the illustrative embodiment is practically applied, the components may be arranged in various directions with the upper side and the lower side reversed, for example.

Figure 1B:
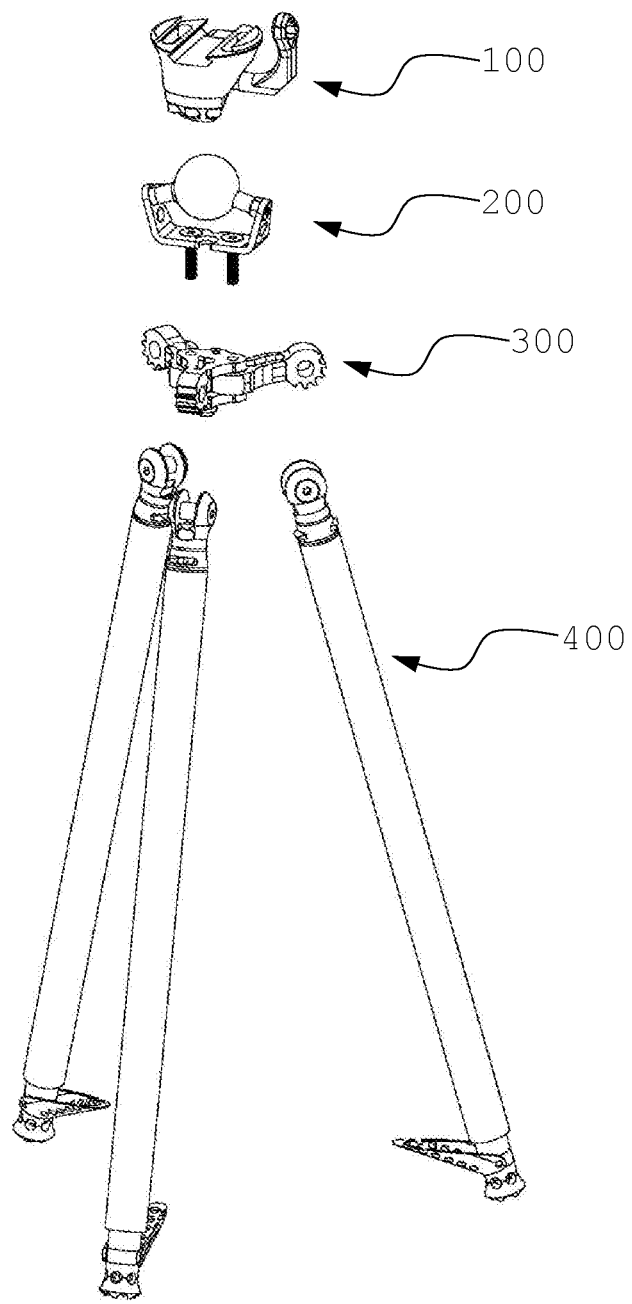

With reference to FIG. 1A and FIG. 1B, a quickly deployable tripod 10 is comprised of a helmet unit 100 formed at the top thereof, a ball unit 200 connected inside the helmet unit 100, a yoke unit 300 connected at the bottom of the ball unit 200, and a plurality of the leg units 400 connected to the yoke unit 300.

The helmet unit 100 is configured to fix an object thereon. The ball unit 200 is configured to adjust orientation of the helmet unit 100. The yoke unit 300 is configured to adjust position of the plurality of leg units 400. And, the plurality of the leg units 400 is configured so that a length thereof is extendable respectively.

The object may be a thing that needs a fixed orientation and a position, preferably a firearm, spotting scope, laser designator, artillery, a camera, and hand held devices.

Figure 2:
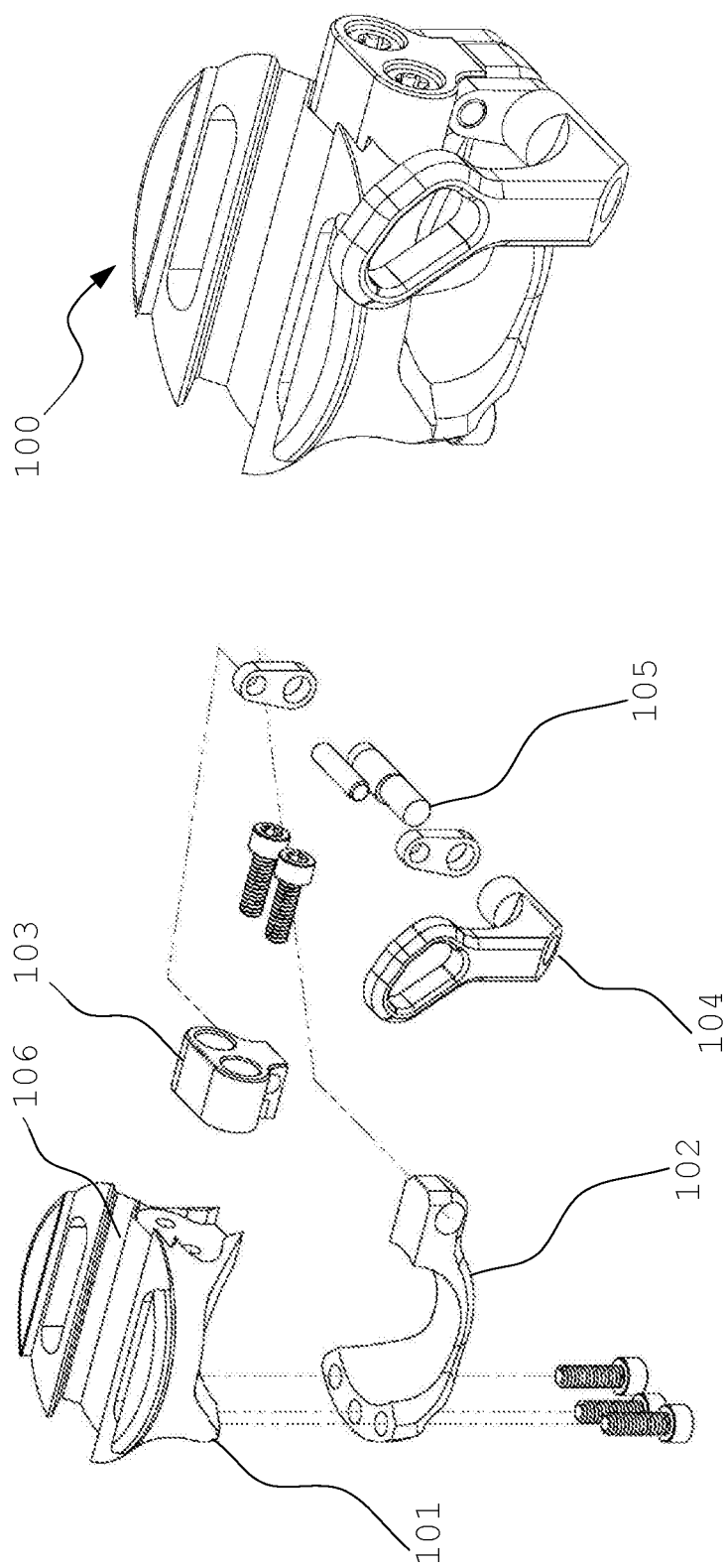
FIG. 2 is a perspective view and an expanded view of a helmet unit in accordance with an illustrative embodiment.

In FIG. 2, the helmet unit 100 further comprises a neck 101 formed at the top of the helmet unit 100, a brow 102 connected to the bottom of the neck 101, a nose 103 connected to both the neck 101 and the brow 102, and a lever 104 connected to the brow by a dual-axis pin 105.

The neck 101 is configured to form a holding groove 106 to fix the object thereon. The neck 101 and the brow 102 is configured to house the ball unit 200. And, the lever 104 is configured to hold and release the ball unit 200 by rotating thereof.

Figure 3:
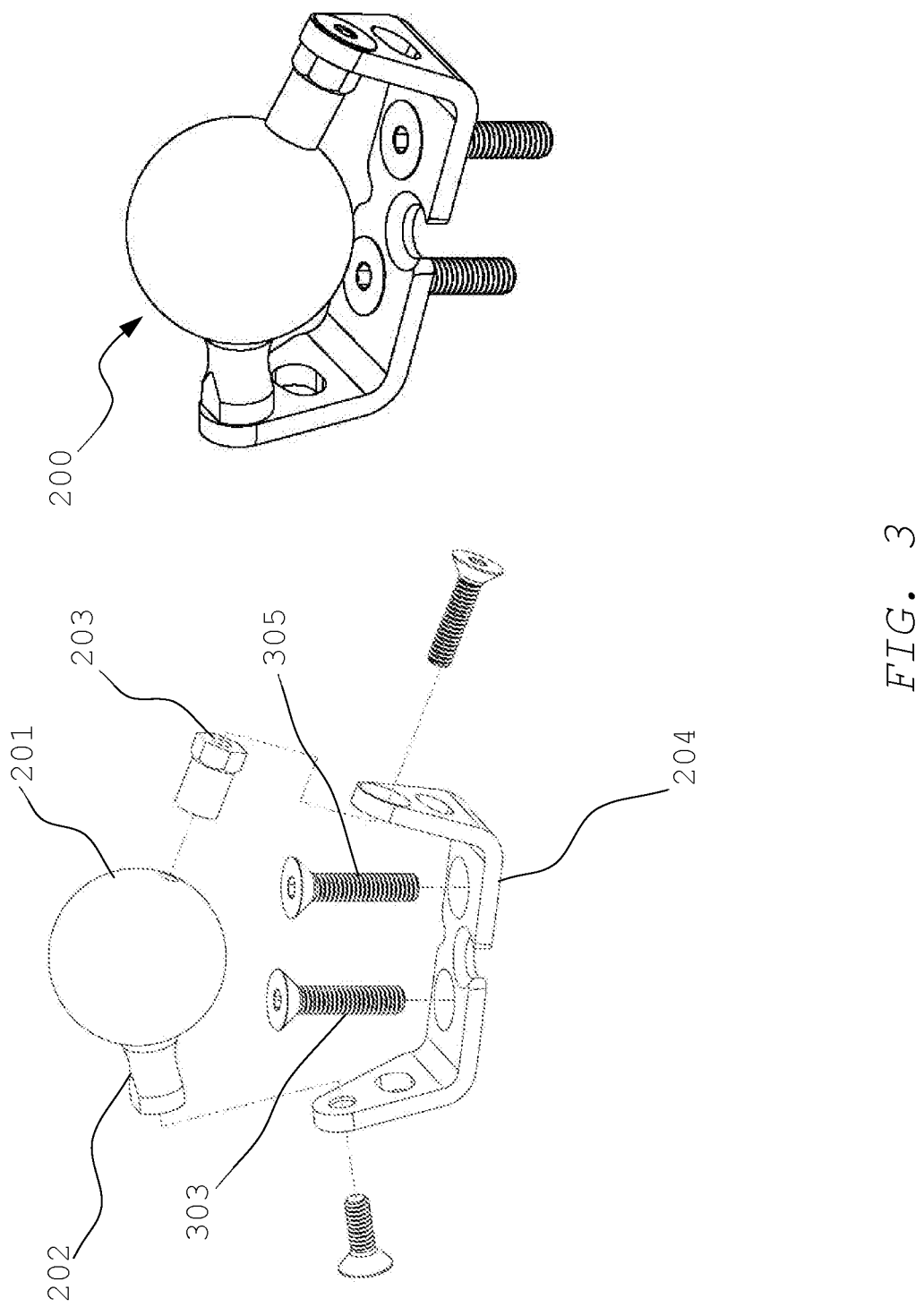
FIG. 3 is a perspective view and an expanded view of a ball unit in accordance with an illustrative embodiment.

In FIG. 3, the ball 200 unit further comprises a ball 201 formed at the top of the ball unit 200, a plurality of the studs 202, 203 connected to both sides of the ball 201, and a suspension bar 204 connected to the plurality of the studs 202, 203.

The ball 201 is housed by the helmet unit 100 and configured to be held and released by the lever 104.

Figure 4:
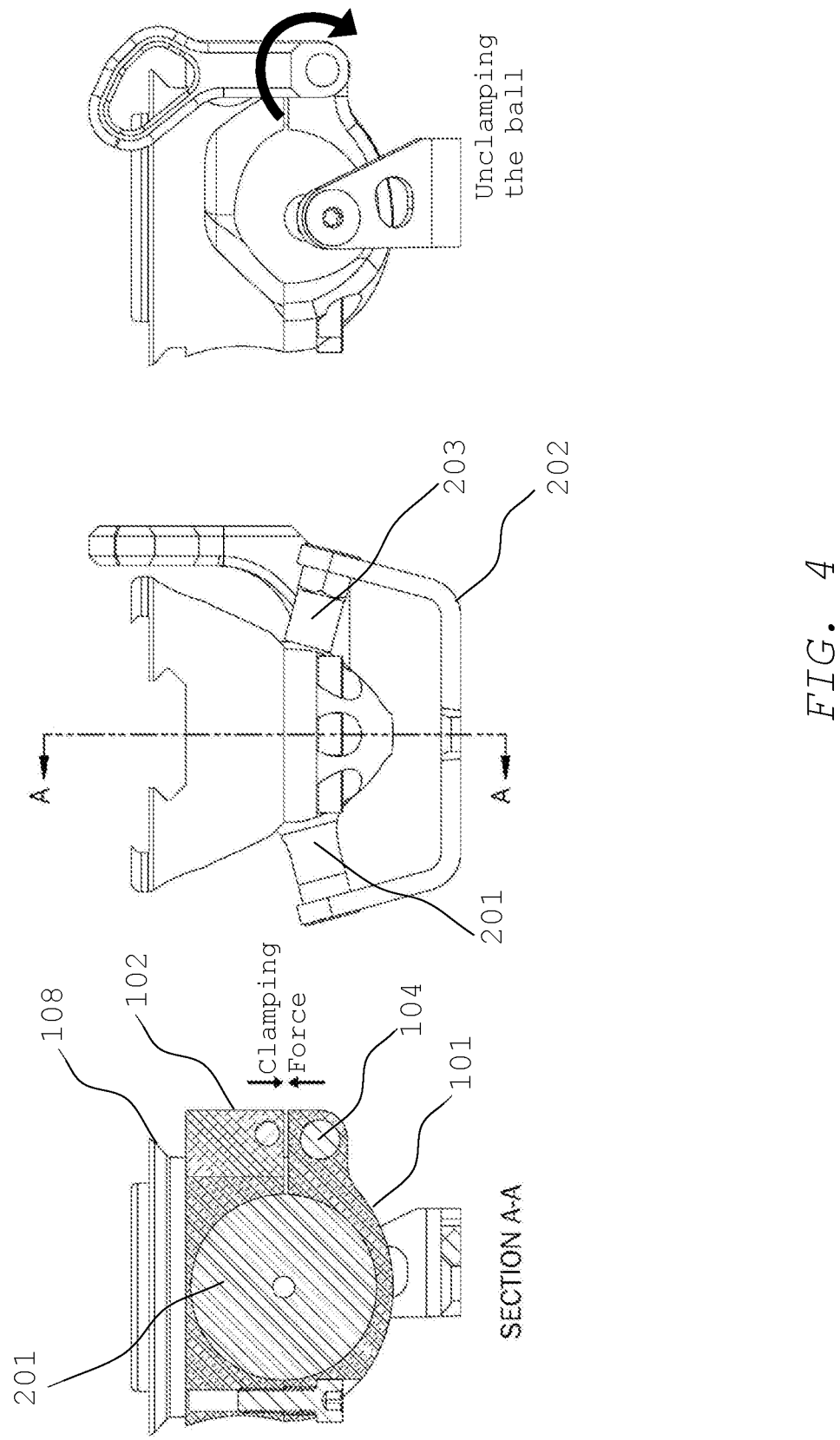
FIG. 4 is a perspective view and a cross-sectional view of an assembled helmet and ball unit in accordance with an illustrative embodiment.

More specifically, the detailed description of the orientation of the helmet unit 100 is disclosed as follows with reference to FIG. 4.

The helmet unit 100 and the ball unit 200 is configured as a ball and socket joint, with the helmet unit 100 representing the socket. By bolting the neck 101 and the brow 102 together around the ball 201, the ball 201 is held but allowed to roll, pitch and yaw. When a force is imparted to clamp together the ball 201 is seized by the neck 101 and the brow 102 and not allowed to move.

A force can be imparted to clamp together by rotating the dual-axis pin 105. The dual-axis pin 105 can be rotated by pulling or pushing on the lever 104 until the desired level of clamping force is achieved. Rotating the lever 104 in the opposite direction will un-clamp the neck 101 and the brow 102, releasing the ball to once again roll, pitch and yaw. The ball 201 is suspended on the suspension bar 204, allowing the helmet unit 100 the greatest amount of freedom permissible. The ball 201 is limited in its movement only when the plurality of the studs 202, 203 on the ball 201 comes into contact with some part of the helmet unit 100.

Figure 5:
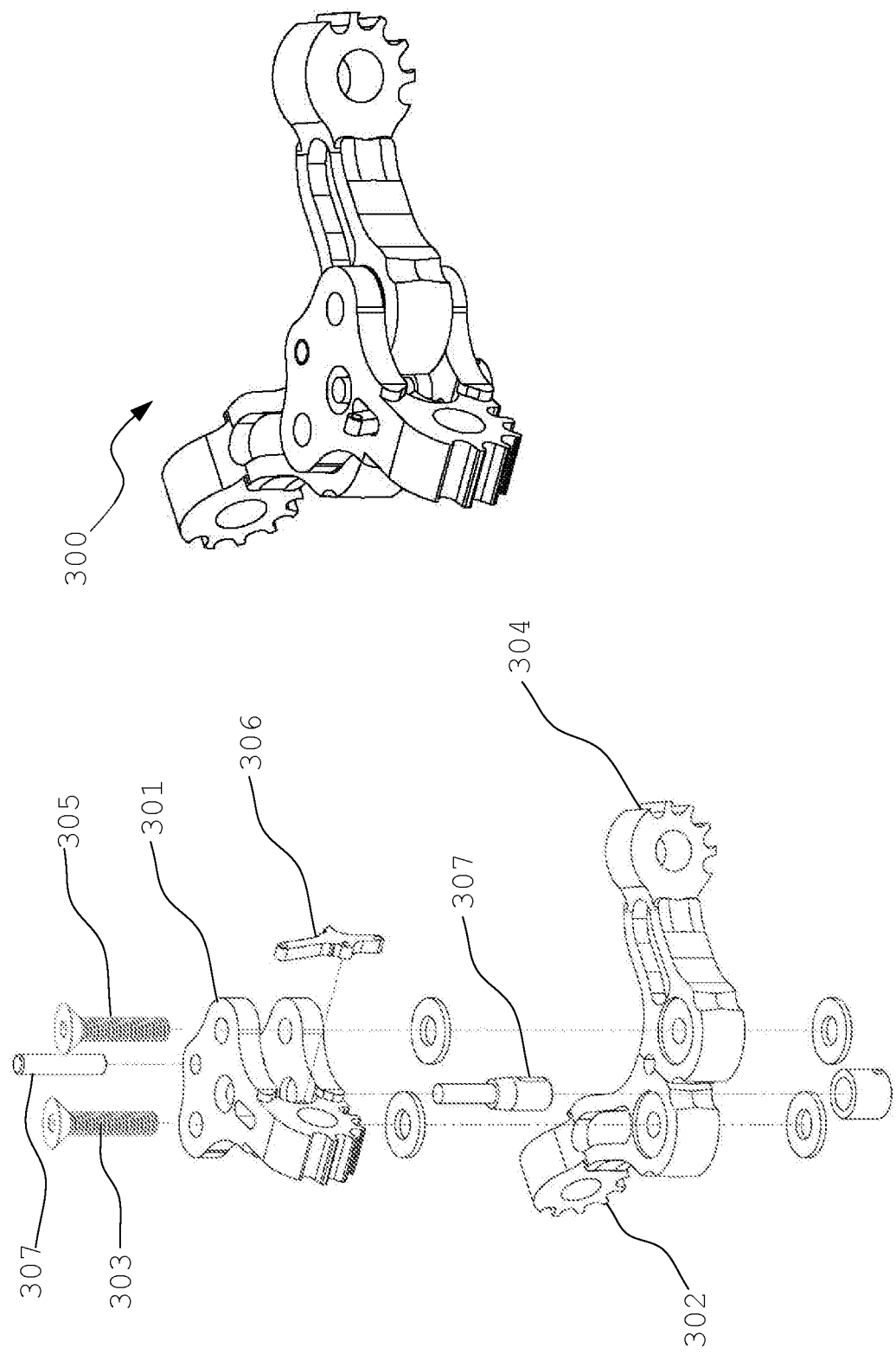
FIG. 5 is a perspective view and an expanded view of a yoke unit in accordance with an illustrative embodiment

In FIG. 5, the yoke unit 300 further comprises a spine 301 formed at the center of the yoke unit with a serrated feature formed at one end thereof, a left arm 302 connected to the spine 301 by a left arm connecting pin 303 with a serrated feature formed at one end thereof, a right arm 304 connected to the spine 301 by a right arm connecting pin 305 with a serrated feature formed at one end thereof, a drop lever 306 located inside the spine 301, and a tapered pin 307 located inside the spine and aligned at both ends of the left arm 302 and the right arm 304.

The spine 301 is configured to encompass the left arm 302 and the right arm 304. The drop lever 306 is configured to change a position of the tapered pin 307. And, the tapered pin 307 is configured to lock and unlock the left arm 302 and the right arm 304.

The arms 302, 304 are configured to rotate freely along the arm connecting pins 303, 305 respectively when unlocked by the tapered pin 307.

Figure 6A:
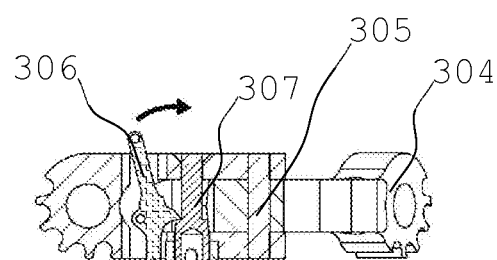
FIG. 6A and FIG. 6B are a perspective view and a cross-sectional view of the yoke unit at different arm positions in accordance with an illustrative embodiment.
Figure 6A:
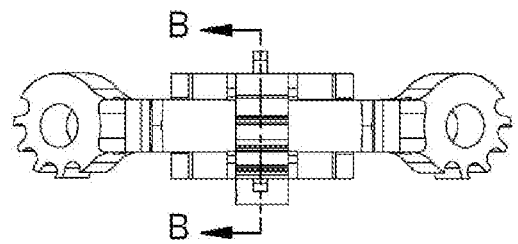
Figure 6A:
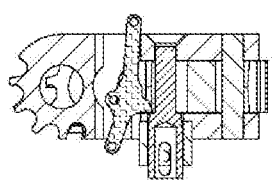
Figure 6A:
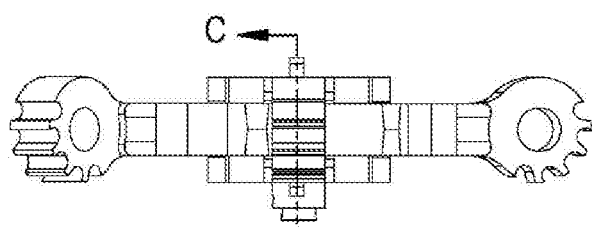
Figure 6A:
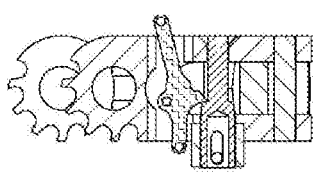
Figure 6A:
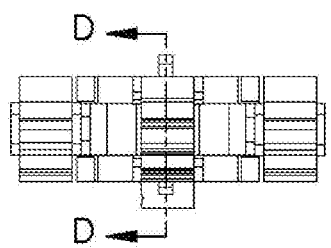
Figure 6B:
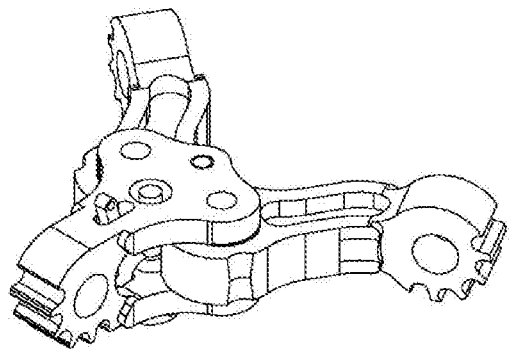
Figure 6B:
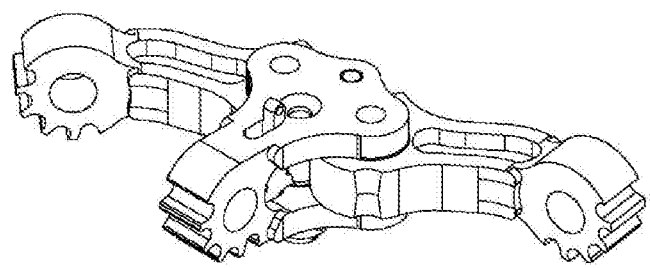
Figure 6B:
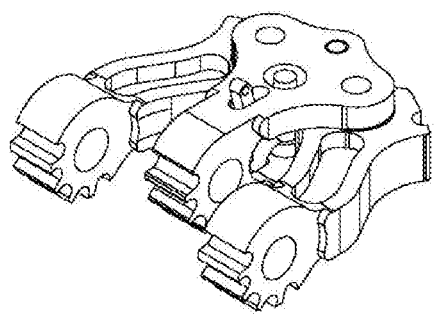

More specifically, the detailed description of the various positions of the left arm 302 and the right arm 304 in the yoke unit 300 is disclosed as follows with reference to FIG. 6A and FIG. 6B.

The yoke unit 300 is configure to have a mechanism that is designed to allow the rapid deployment/folding of the plurality of leg units 400 attached to the serrated feature of the left arm, the right arm and the spine, while holding them very rigidly while either deployed or folded. To achieve this, the user manipulates the drop lever 306 by rotating it about its axis. Rotating the drop lever 306 causes the tapered pin 307 to move downwards, causing the tapered pin 307 to disengage the arms 302, 304, and they become free to rotate along the arm connecting pins 303, 305.

When rotating out to the deployed position from the folded position, the arms 302, 304 will stop their travel when they engage a stop pin 307. When rotating back, the arms 302, 304 will collide and be aligned, ceasing their rotational movement. When not actively being depressed by the lever 306, the tapered pin 307 is pushed up by a spring therein.

Figure 7:
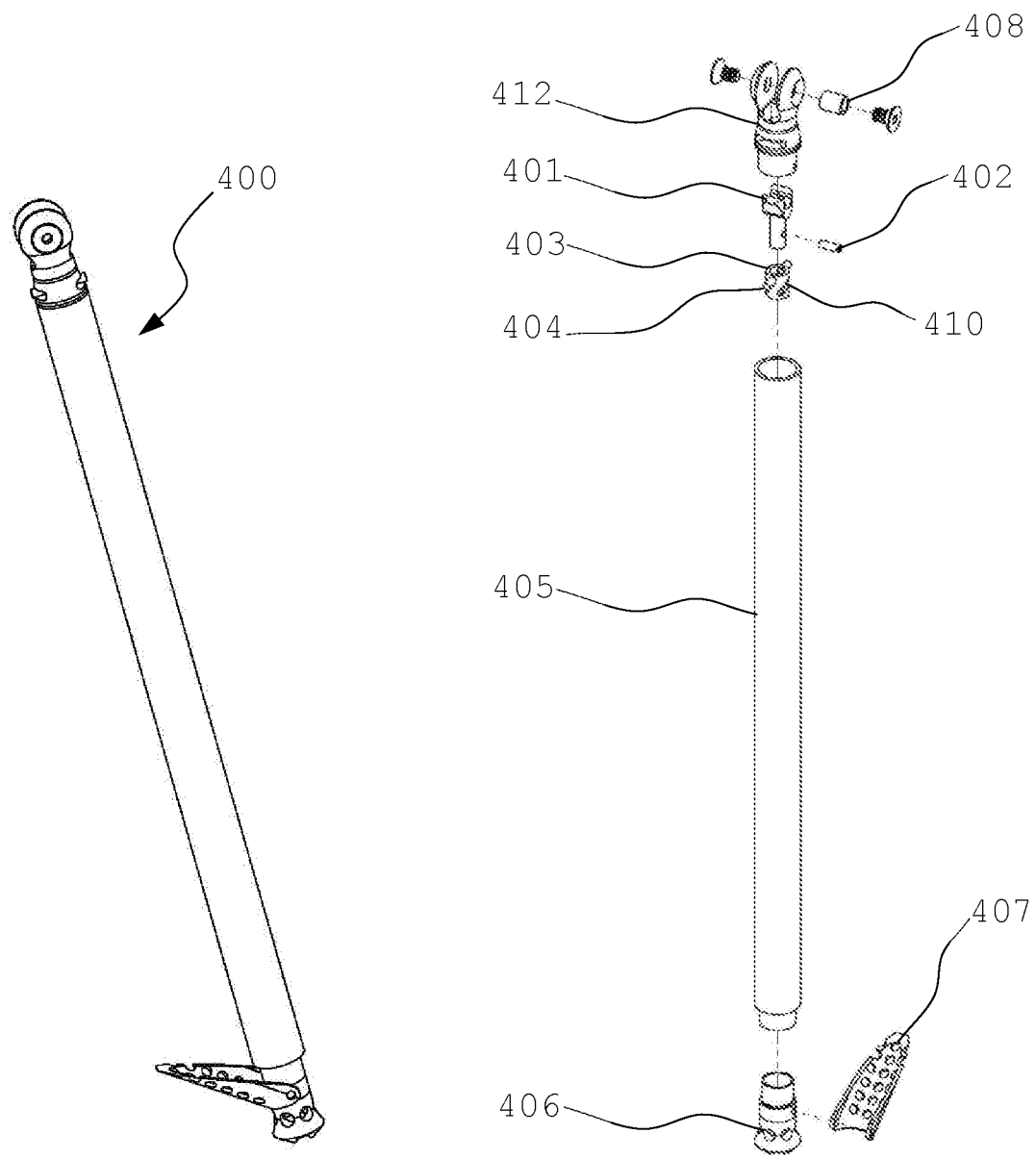
FIG. 7 is a perspective view and an expanded view of a plurality of the leg units in accordance with an illustrative embodiment.
Figure 8:
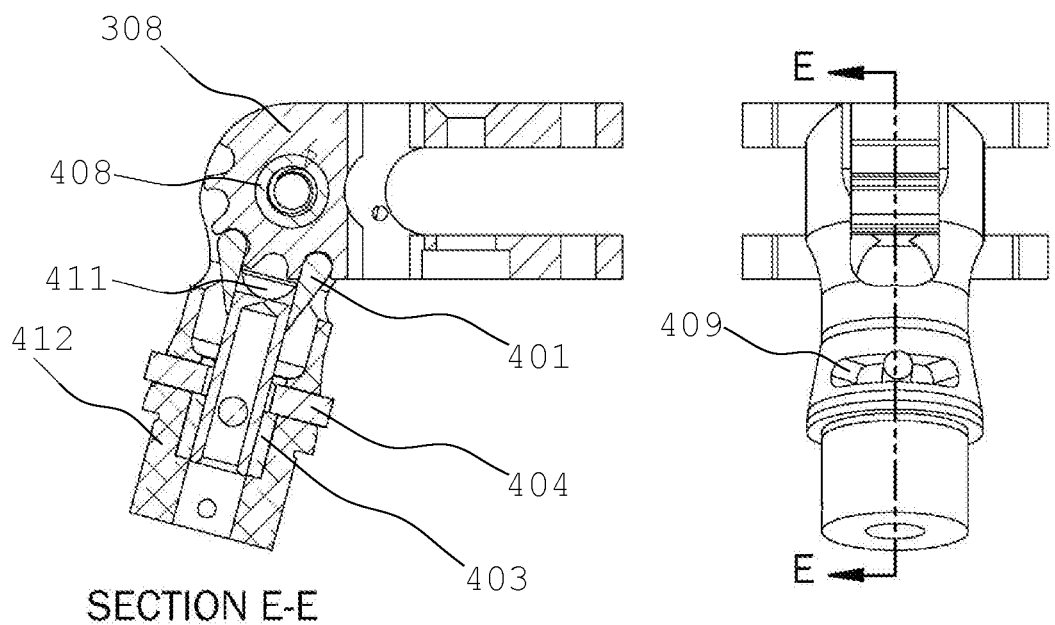
FIG. 8 is a perspective view and a cross-sectional view of engagement/disengagement of a locking collar in accordance with an illustrative embodiment.
Figure 8:
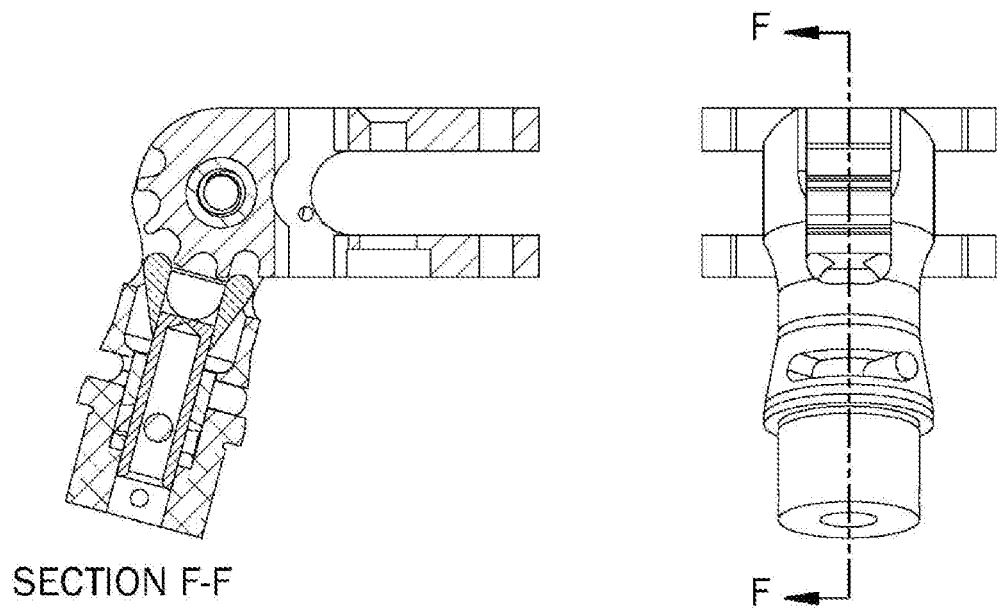

In FIG. 7 and FIG. 8, the plurality of the leg units further comprises a leg adapter 412 formed at the top of the plurality of the leg units 400, a fork 401 located inside the leg adapter 412, a locking collar 403 connected at the bottom of the fork 401 by a collar connecting pin 402, a plurality of the extruded rods 404 formed at the locking collar 403 in radial direction thereof, a plurality of the leg tubes 405 connected at the bottom of the leg adapter 412, a shoe 406 connected at the bottom of the plurality of the leg tubes 405, and a fishhook 407 connected on the side of the shoe 406.

The plurality of leg units 400 is attached by connecting the leg adapter 412 thereof to the end of the left arm 302, the right arm 304, and the spine 301 using a leg bushing 408 respectively.

The plurality of the extruded rods 404 formed at the locking collar 403 is configured to move along a slot 409 formed at the side of the leg adapter 412. The fork 401 is configured to engage and disengage to the serrated feature of the left arm 302, the right arm 304, and the spine 301 respectively according to the position of the plurality of the extruded rods 404. And, the plurality of the leg units 400 is configured to rotate freely along the leg bushing 408 when the fork 401 is disengaged.

The plurality of leg tubes 405 is telescopically configured so that a length thereof is extendable.

The fishhook 407 is configured to unfold to locate the plurality of the leg units 400 on edges of a wall or on a surface of the ground.

More specifically, the detailed description of the locking/unlocking the plurality of the leg units 400 is disclosed as follows with reference to FIG. 8.

When the plurality of studs 404 is pulled to either side of the slot 409, the locking collar 403 is rotated about the axis of the plurality of leg units 400.

A cam track 410 inside the locking collar 403 engages with the collar connecting pin 402, which cannot rotate with the locking collar 403 because it is also linked to the fork 401 which cannot rotate. This translates to a motion that pulls the fork 401 away from the spine 301 and the arms 302, 304, unlocking the plurality of leg units 400 and allowing it to rotate along the leg bushing 408.

When the plurality of extruded rods 404 is released, a spring 411 inside the fork 401 pushes the fork 401 back into engagement with the spine 300 or arms, locking the mechanism in position.

Figure 9:
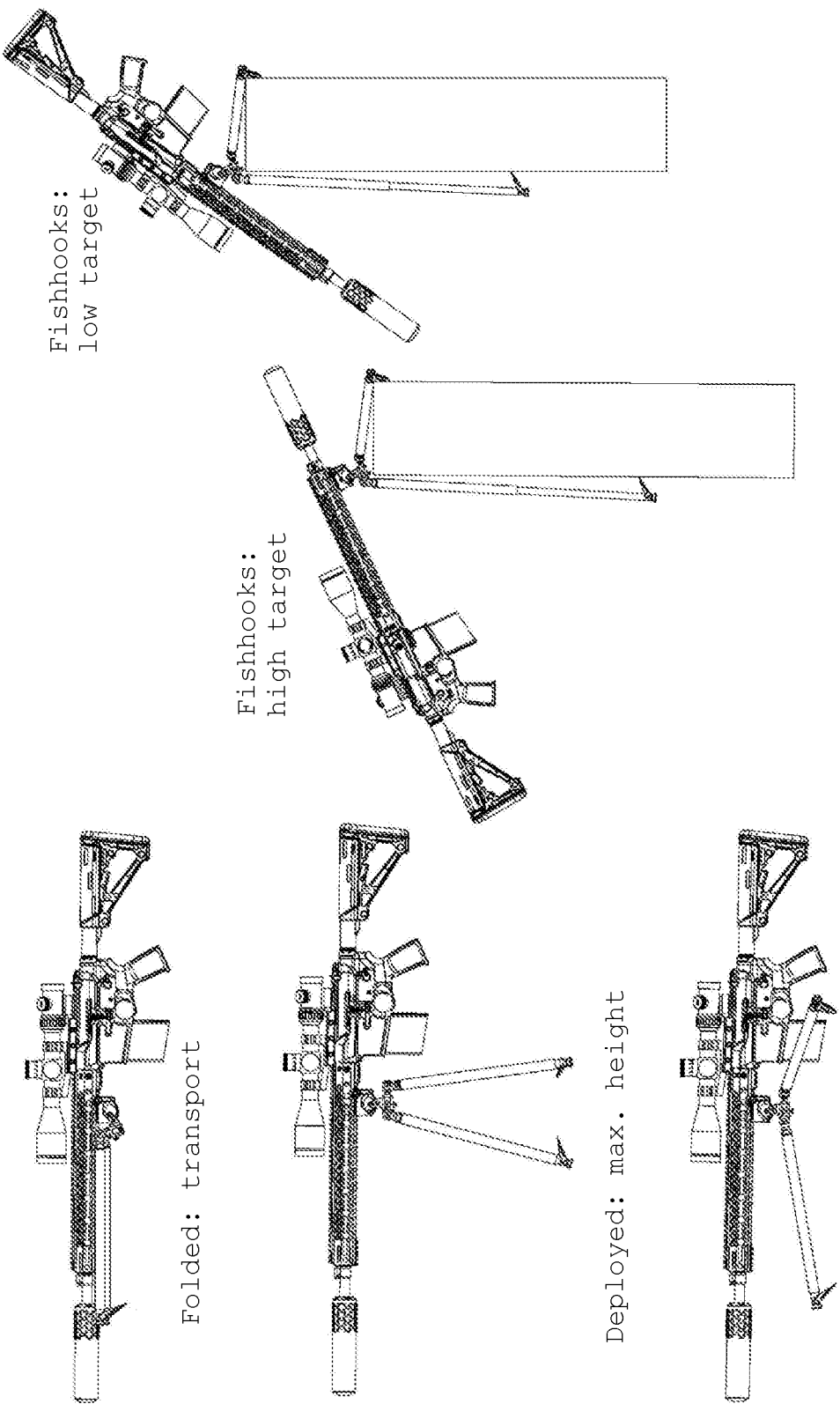
FIG. 9 is exemplary views of the quickly deployable tripod when attached to a firearm.

The FIG. 9 shows exemplary views of the quickly deployable tripod when attached to a firearm. The quickly deployable tripod is attached onto the firearm with minimum occupancy of space. The plurality of leg units 400 is aligned along the longitudinal direction of the firearm by folding them together. Also, with quickly deployable mechanism disclosed in the present invention, the user can deploy the tripod in a fast and effective way in several different configurations to optimize positioning.

Also, in FIG. 9, with the use of the fishhook which can be hung over the edge of walls, the firearm position is stabilized without contacting the ground.

The description above of the illustrative embodiments is provided for the purpose of illustration, and it would be understood by those skilled in this profession so that various changes and modifications may be made without changing technical concepts and essential features of the illustrative embodiments. Thus, it is clear that the illustrative embodiments described above are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A quickly deployable tripod, comprising:
   a helmet unit formed at a top thereof;
   a ball unit connected inside the helmet unit;
   a yoke unit connected at a bottom of the ball unit; and,
   a plurality of leg units connected to the yoke unit;
   wherein the yoke unit further comprises:
   a spine formed at a center of the yoke unit with a serrated feature formed at one end thereof;
   a left arm connected to the spine by a left arm connecting pin with a serrated feature formed at one end thereof;
   a right arm connected to the spine by a right arm connecting pin with a serrated feature formed at one end thereof;
   a drop lever located inside the spine; and,
   a tapered pin located inside the spine and aligned at both ends of the left arm and the right arm.

2. The apparatus of claim 1,
   wherein the helmet unit is configured to fix an object thereon;
   wherein the ball unit is configured to adjust orientation of the helmet unit;
   wherein the yoke unit is configured to adjust position of the plurality of leg units; and,
   wherein the plurality of leg units is configured to adjust orientation thereof respectively.

3. The apparatus of claim 1,
   wherein the helmet unit further comprises:
   a neck formed at the top of the helmet unit;
   a brow connected to the bottom of the neck;
   a nose connected to both the neck and the brow; and,
   a lever connected to the brow by a dual pin.

4. The apparatus of claim 3,
wherein the neck and the brow are configured to house the ball unit; and,
wherein the lever is configured to hold and release the ball unit by rotating thereof.

5. The apparatus of claim 1,
wherein the ball unit further comprises:
a ball formed at the top of the ball unit;
a plurality of studs connected to both sides of the ball; and,
a suspension bar connected to the plurality of studs.

6. The apparatus of claim 5,
wherein the ball is housed by the helmet unit and configured to be held and released by the drop lever.

7. The apparatus of claim 1,
wherein the spine is configured to encompass the left arm and the right arm;
wherein the drop lever is configured to change a position of the tapered pin; and,
wherein the tapered pin is configured to lock and unlock the left arm and the right arm.

8. The apparatus of claim 7,
wherein the left arm and the right arm are configured to move freely along the left arm connecting pin and the right arm connecting pin respectively when unlocked by the tapered pin.

9. The apparatus of claim 1,
wherein the plurality of leg units further comprises:
a leg adapter formed at the top of the plurality of leg units;
a fork located inside the leg adapter;
a locking collar connected at the bottom of the fork by a collar connecting pin;
a plurality of extruded rods formed at the locking collar in radial direction thereof;
a plurality of leg tubes connected at the bottom of the leg adapter;
a shoe connected at the bottom of the plurality of the leg tubes; and,
a fishhook connected on a side of the shoe.

10. The apparatus of claim 9,
wherein the plurality of leg units is attached by connecting the leg adapter thereof to the end of the left arm, the right arm, and the spine using a leg bushing respectively.

11. The apparatus of claim 9,
wherein the plurality of extruded rods formed at the locking collar is configured to move along a slot formed at the side of the leg adapter;
wherein the fork is configured to engage and disengage to the serrated feature of the left arm, the right arm, and the spine respectively according to a position of the plurality of extruded rods; and,
wherein the plurality of leg units is configured to rotate freely along the leg connecting pin when the fork is disengaged.

12. The apparatus of claim 11,
wherein the plurality of leg tubes is telescopically configured so that a length thereof is extendable.

13. The apparatus of claim 12,
Wherein the fishhook is configured to unfold to locate the plurality of leg units on edges of a wall or on a surface of a ground.

14. The apparatus of claim 1,
wherein an object is a thing that needs a fixed orientation and a position, a firearm, spotting scope, laser designator, artillery, a camera, and hand held devices.

* * * * *